Oct. 5, 1965   F. L. MOSELEY ETAL   3,210,663
RMS METER USING OPPOSED THERMOCOUPLES CONNECTED IN AN
AUTOMATICALLY REBALANCED CONSTANT GAIN SERVO LOOP
Filed Nov. 4, 1960   3 Sheets-Sheet 1

FRANCIS L. MOSELEY
ANDRES O. HOLDO
         INVENTORS

BY
         ATTORNEYS

FRANCIS L. MOSELEY
ANDRES O. HOLDO
INVENTORS

BY
ATTORNEYS

FRANCIS L. MOSELEY
ANDRES O. HOLDO
INVENTORS

ATTORNEYS

United States Patent Office 3,210,663
Patented Oct. 5, 1965

3,210,663
R.M.S. METER USING OPPOSED THERMOCOUPLES CONNECTED IN AN AUTOMATICALLY REBALANCED CONSTANT GAIN SERVO LOOP
Francis L. Moseley, San Gabriel, and Andres O. Holdo, Pasadena, Calif., assignors to F. L. Moseley Co., a corporation of California
Filed Nov. 4, 1960, Ser. No. 67,331
10 Claims. (Cl. 324—99)

This invention relates to alternating current measuring instruments and more particularly to such instruments for providing an indication of the R.M.S. (root-mean-square) value of an alternating current wave.

Various instruments are available for providing an output indication of an input voltage or current based upon the average value of an alternating (A.C.) input function. Other instruments are available for providing an output indication based upon the peak value of the A.C. input function. Such devices are reasonably accurate, and therefore quite suitable, when the input function conforms to a sine wave or other A.C. wave, the shape of which is known.

In a large number of situations, however, as for example in a study of the vibration damping characteristics of a particular mounting arrangement, it is most important that the effective value of an A.C. waveform presented for analysis be ascertained. The effective value, as is well known, is by definition the root-mean-square, or R.M.S., value of an alternating waveform. Moreover, in the above mentioned situations of interest, the waveform is generally of a complex nature which precludes conversion to the effective value of any indication based upon average or peak values. Thus, automatic indicating devices which operate upon peak or average reading principles are inadequate in such situations.

It is an object of the invention to provide an improved automatic measuring device for alternating current waveforms.

It is another object of this invention to provide increased accuracy in a device for automatically measuring the R.M.S. value of an alternating waveform.

More particularly, it is an object of this invention to provide an R.M.S. measuring instrument whose accuracy is unaffected by ambient temperature variations.

Briefly, in accordance with the invention a pair of thermocouples having identical characteristics are connected together in an electrical circuit so that the outputs of the individual thermocouples are opposed in polarity. At the input of one of the thermocouples a signal is applied which is derived from the waveform to be measured. The input of the other thermocouple is coupled to an A.C. reference voltage, the magnitude of which is controlled in a feedback loop from the output of the measuring apparatus. Depending upon which of the two thermocouples receives a stronger signal at its input, the resultant output of the interconnected thermocouples will be a signal of variable magnitude and polarity. This signal is then converted to an alternating signal, amplified, and finally applied to a control winding of a servo motor. The servo motor drives an indicating device and is also coupled to the mechanical feedback loop. Thus, it varies the A.C. reference voltage applied to the second thermocouple input until the two thermocouples are balanced. Since the output of each of the thermocouples depends upon the temperature thereof, which in turn is dependent upon the input energy and therefore a function of the R.M.S. value of the waveform applied to the input, the indication given when the two thermocouples are balanced is a true measurement of the R.M.S. value of the input waveform being measured.

Prior R.M.S. measuring instruments which have relied upon a thermocouple to provide an indication of an applied waveform have suffered from the effects of ambient temperature variations upon the operation of the individual thermocouple element. This difficulty is overcome in the structure of the instant invention, in accordance with one aspect thereof, by the utilization of two thermocouples, one responsive to the waveform to be measured and the other responsive to a known A.C. reference signal. These two thermocouples are positioned adjacent one another within the same enclosure so that the effects of ambient temperature variations are cancelled out. That is, the ambient temperature effect upon one thermocouple is identical with that upon the other and, since the output indication is provided when the thermocouple signals are balanced, the undesirable ambient temperature effects are automatically compensated for.

It is desirable in a servo mechanism of the type herein involved to maintain a constant gain throughout the feedback loop. However, in view of the fact that thermocouples are power responsive devices, the output of the thermocouple circuit is a quadratic function of the applied voltage to be measured. In order to maintain the desired constant gain throughout the feedback loop, therefore, a portion of the circuit which amplifies the signals to be applied to the control winding of the servo motor is arranged to have a controllably variable gain which varies inversely with respect to the amplitude of the applied input voltage. In the arrangement of the instant invention this variable gain is controlled by the position of the servo motor shaft which controls the A.C. reference voltage. In this way the gain of the servo feedback loop is maintained substantially constant so that the response of the servo motor will be the same over a wide range of input signal amplitudes.

A more complete understanding of the invention may be gained from a consideration of the following detailed description taken in conjunction with the drawings in which.

Figure 1:
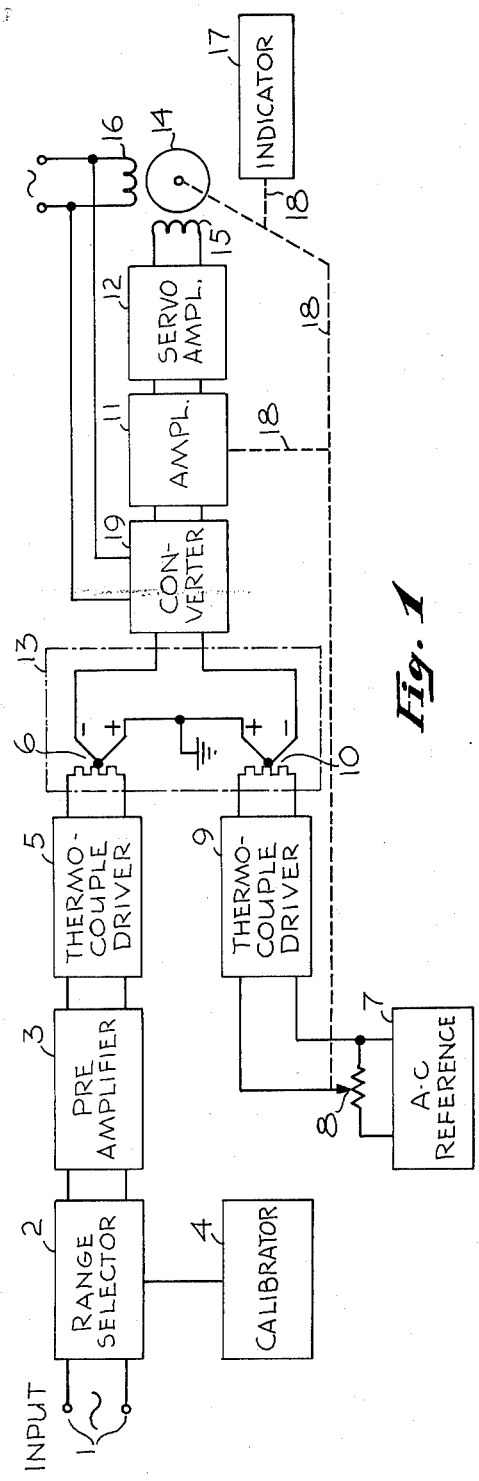
FIG. 1 is a block diagram of an embodiment of the invention.

In the block diagram of FIG. 1 an R.M.S. voltage measuring instrument in accordance with the invention is shown having a pair of terminals 1 to which an alternating waveform may be applied as an input signal. A range selector 2 and preamplifier 3 provide a signal derived from the input waveform which is suitable for presentation to the thermocouple 6. The thermocouple driver 5 connected between the preamplifier 3 and the thermocouple 6 is essentially an impedance matching device and serves to couple the preamplifier 3 to the thermocouple 6. A calibrator 4 is shown connected to the range selector 2 and provides a precisely regulated voltage for calibration of the instrument.

An A.C. reference source 7 is connected to a potentiometer 8 having a movable arm which picks off a variable voltage for application to the thermocouple driver 9 connected to the input of a second thermocouple 10. While the two thermocouples 6 and 10 are energized by signals from different sources, it will be noted that their respective outputs are connected together in a single circuit and that the output voltages are arranged to be in opposed polarity. A converter 19 is connected to the combined output of the two thermocouples 6 and 10 for providing an amplified A.C. signal corresponding to the resultant D.C. output therefrom. This signal, corresponding in magnitude and phase to the thermocouple resultant output voltage, is amplified by an amplifier 11 and a servo amplifier 12 from which it is applied to a control winding 15 of a servomotor 14. A second winding 16 of the servomotor 14 is energized by a reference A.C. signal which also supplies a reference phase for the converter 19. The servomotor 14 is connected by mechanical linkages, represented by the dashed lines 18, to an indicator 17, to the amplifier 11, and to the movable arm of the potentiometer 8.

In operation, a signal to be measured is applied to the input terminals 1. The signal thermocouple 6 is energized in accordance with this signal and so produces a D.C. output voltage corresponding to the effective, or R.M.S., value of the input waveform. Concurrently the reference thermocouple 10 is energized in accordance with the R.M.S. value of the A.C. reference waveform picked off by the arm of the potentiometer 8. The output of the A.C. reference 7 is precisely controlled so that, when balanced in the circuit of the thermocouples 6 and 10, it provides the basis for an accurate determination of the effective magnitude of the input voltage being measured.

Assuming for the purpose of illustration that the signal thermocouple 6 is energized with a stronger signal than is the reference thermocouple 10, a negative voltage is applied to the upper input terminal of the converter 19. As a result a signal is applied to the control winding 15 having a phase relative to the reference signal of the control winding 16 which causes the servomotor 14 to move the arm of the potentiometer 8 toward the left in the diagram of FIG. 1 so as to pick off a larger voltage from the A.C. reference 7. If, however, the signal applied to the reference thermocouple 10 exceeds that applied to the signal thermocouple 6, the lower input terminal of the converter 19 is driven negative and a signal of reverse phase is applied to the control winding 15. This causes the servomotor 14 to rotate in the opposite direction and reduce the voltage picked off by the movable arm of the potentiometer 8. In each case, the servomotor 14 serves to balance the inputs of the two thermocouples 6 and 10 so that their output voltages are equal.

As the servomotor 14 balances the thermocouple circuit, it drives the indicator 17 so that when a condition of balance is established the indicator 17 provides a reading of the true R.M.S. value of the input waveform applied to the terminals 1. While this indicator 17 is shown as a device mechanically coupled to the servomotor 14, it should be understood that it might equally well be a measuring instrument connected across the output terminals of the potentiometer 8, since the wave shape of the A.C. voltage at this point is precisely controlled in accordance with the invention. Thus a suitably calibrated conventional voltmeter might be used at this point as an accurate indicator, while it could not be so used to accurately measure the input signal which may vary considerably in its wave shape.

It will be noted that the thermocouples 6 and 10 are shown enclosed within a dot-dash line rectangle 13. The rectangle 13 represents an enclosure which, in accordance with an aspect of the invention, serves to remove any effect of variations in ambient temperatures upon the accuracy of the R.M.S. measuring instrument. Since the output of a thermocouple is dependent upon the temperature of the device, it will be appreciated that variations in ambient temperature usually interfere with the accuracy of measurement of a signal applied to energize a thermocouple. In the measuring instrument of the invention, however, a pair of thermocouples are used which have their outputs balanced against each other so that a suitable indication of an input signal may be provided. In this desirable arrangement, the two thermocouples are maintained within a single enclosure 13 so that the effect of ambient temperature variation upon one is arranged to be identical with the effect upon the other. Therefore the two effects balance each other out and the accuracy of the apparatus as a measuring instrument is advantageously freed from ambient temperature effects.

Figure 2A:
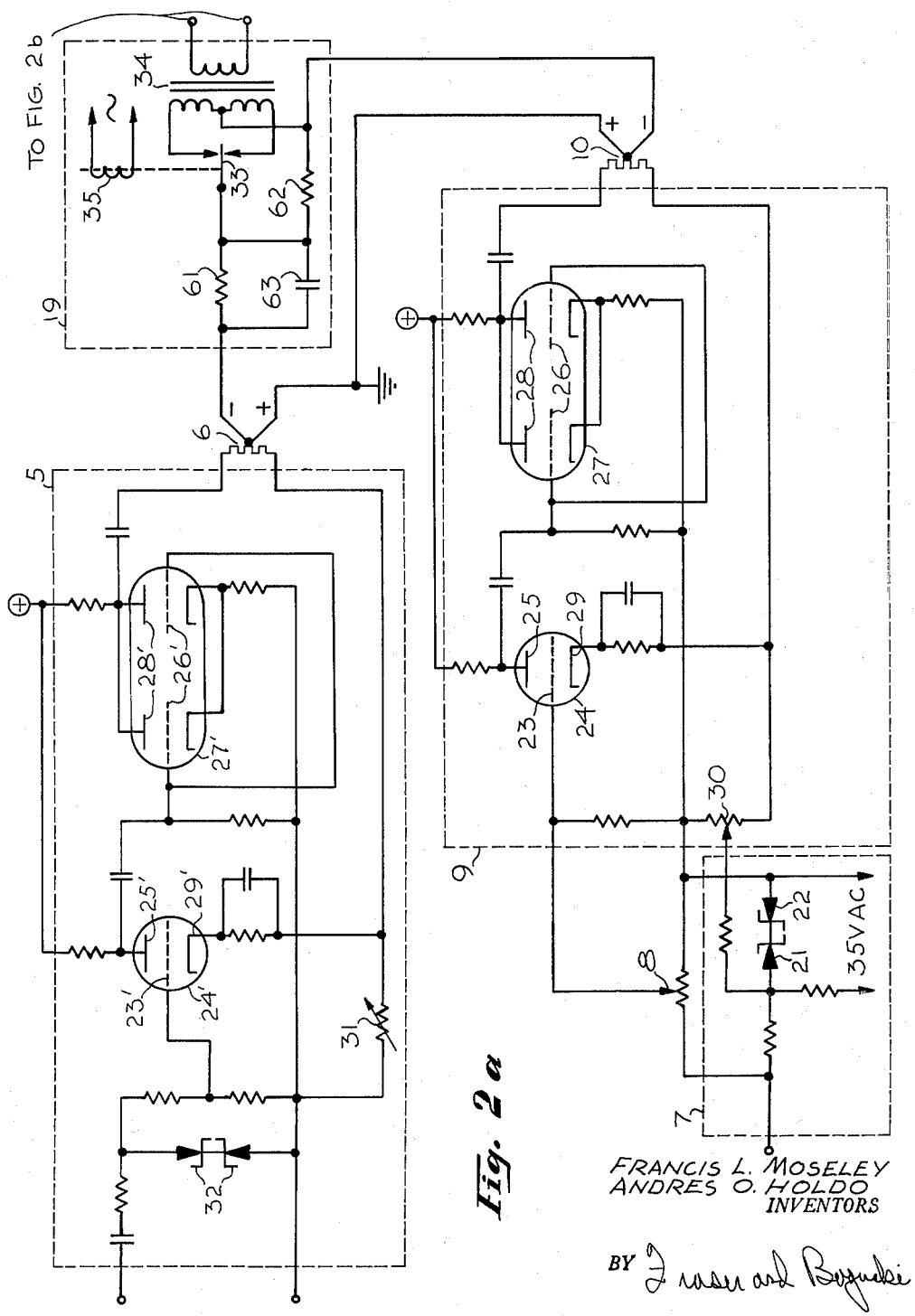
FIGS. 2a and 2b are schematic diagrams of particular portions of the embodiment of FIG. 1.

FIG. 2a represents schematically the thermocouple input circuits including the A.C. reference 7, the potentiometer 8, the thermocouple drivers 5 and 9, and the thermocouples 6 and 10, together with the converter 19 of FIG. 1. The A.C. voltage for the thermocouple 10 is precisely regulated in order that it may have the accuracy desired for a reference voltage. It is first regulated by a constant voltage transformer (not shown) and then applied across the zener diodes 21 and 22 which are arranged in a back-to-back connection. These diodes perform the function of squaring the input wave by clipping the peaks of the waveform at a predetermined amplitude, thus further providing for the desired regulation, both of wave shape and amplitude, of the A.C. reference voltage. The regulated wave is then applied across the potentiometer 8 and the output therefrom is applied to the thermocouple driver 9.

Both the thermocouple drivers 5 and 9 are similar circuits which are known in the art. They are feedback type amplifiers with a stabilized gain for providing an impedance match between the applied signals and the corresponding thermocouple connected across the output. In the thermocouple driver 9, signals applied to the control grid 23 of the vacuum tube 24 are amplified therein and coupled from the plate 25 to the control grids 26 of a twin triode 27 which has its separate sections operated in parallel. The signal at the plates 28 of the triode 27 is coupled to the thermocouple 10 and fed back in a series feedback loop to the cathode 29 of the input tube 24. The potentiometer 30 connected between the grid 23 and the cathode 29 controls the degree of feedback in the circuit and is included as a zero setting adjustment.

The circuit of the thermocouple driver 5 is substantially the same as that of the thermocouple driver 9 described above and need not be described in further detail here. Primed numeral designations have been given the elements corresponding to those referred to in the description of the thermocouple driver 9. In this circuit however the back-to-back zener diodes 32 serve as overload protectors to prevent the circuit elements and the thermocouple 6 from being damaged by an input signal of excessive amplitude. The rheostat 31 serves to control the gain of the thermocouple driver 5 and is employed in this connection as a calibration control.

The resultant output voltage from the interconnected, polarity-opposed thermocouples 6 and 10 is applied to the converter 19 which principally comprises a polarized chopper having a vibrating reed 33 that makes alternating contact with the opposite terminals of the primary winding of a transformer 34 when its associated winding 35 is energized. Such an arrangement for converting D.C. to A.C. is well known in the art. The resistors 61, 62 and the capacitor 63 form a network which establishes a reference phase for the converted A.C. signal which is presented as the output of the transformer 34. The vibrating reed 33 is operated at a 60 cycle frequency so that the servomotor 14 (FIG. 1) may be energized at the proper frequency. Because the reference phase of this signal is the same as that of the A.C. wave applied to the servomotor winding 16, the phase differences between the signals on the control windings 15 and 16 will be related to the polarity of the resultant D.C. voltage developed by the thermocouples 6 and 10.

Figure 2B:
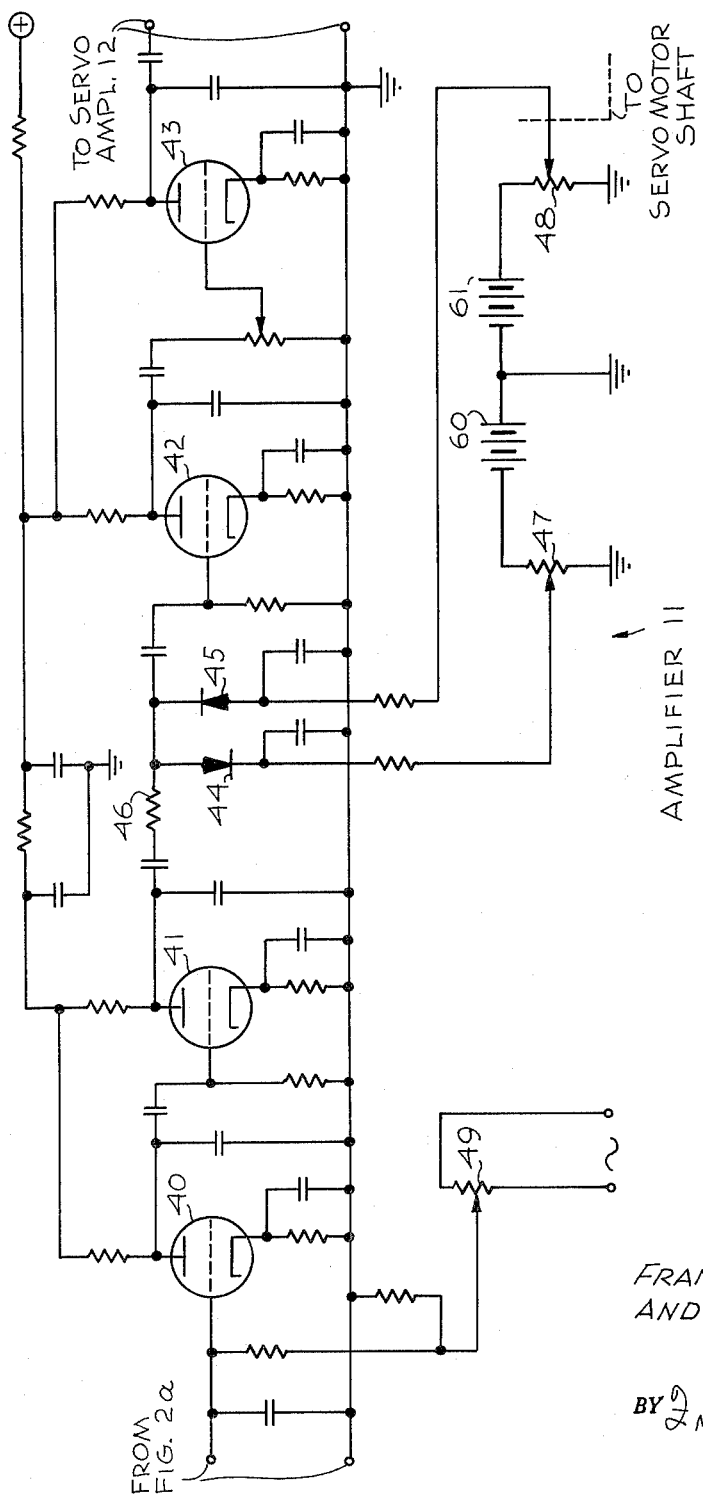

The A.C. signal from a secondary winding of the transformer 34 (FIG. 2a) is applied to an amplifier circuit, represented in FIG. 2b, comprising the vacuum tubes 40–43 which are arranged in known amplifying stage configurations. Connected between the vacuum tubes 41 and 42 is a circuit which provides an automatic gain control of this amplifier in accordance with the shaft position of the servomotor 14. As has already been mentioned, the purpose of this automatic gain control circuit is to compensate for the variation in response with the amplitude of applied signals resulting from the thermocouples themselves. The result is that a constant gain is provided throughout the servo loop.

The variable gain circuit between the vacuum tubes 41 and 42 comprises a pair of diodes 44 and 45 connected effectively in shunt with the signal path at one end of the resistor 46. A potentiometer 47 is connected between the negative terminal of a battery 60 and ground while a potentiometer 48 is connected between the positive terminal of a battery 61 and ground. The diode 44 has its cathode connected to the movable arm of the poteniometer 47 while the diode 45 has its anode connected to the movable arm of the potentiometer 48. The potentiometer 47 is a reference level control and is adjusted by the operator. The potentiometer 48, however, is mechanically linked to the servo motor 14 so that the voltage present on its movable arm is related to the position of the shaft of the servo motor 14, which in turn is dependent upon the amplitude of the applied input voltage.

In operation, the diodes 44 and 45 are normally forward biased in a region presenting a nonlinear impedance characteristic. The impedances of the diodes 44 and 45 form a voltage divider network with the resistor 46 for the signal present at the plate of the tube 41. As the impedance of the diodes 44 and 45 is reduced, the signal presented to the grid of the tube 42 represents a smaller portion of the signal at the plate of the tube 41. This condition occurs as the potentiometer 48 is moved by the shaft of the servo motor 14 to a position corresponding to increased energization of the thermocouples 6 and 10. Thus by means of this arrangement the gain of the amplifier 11 is varied inversely with the strength of the applied signal. Accordingly, compensation is provided for the nonlinear response of the thermocouple circuit and the over-all gain of the servo loop is advantageously maintained constant.

The signal from the plate of the vacuum tube 43 is directed to the servo amplifier 12 and thence to the control winding 15 of the servomotor 14 as is shown in FIG. 1. In the grid circuit of the vacuum tube 40 an arrangement is provided for eliminating stray 60 cycle pickup in the signal path. This arrangement incorporates a potentiometer 49 connected across a winding of the line transformer (not shown). By this arrangement the operator can adjust the potentiometer 49 to provide a 60 cycle signal of suitable polarity and magnitude to cancel out any 60 cycle voltages which may have been picked up on the signal path.

Figure 3:
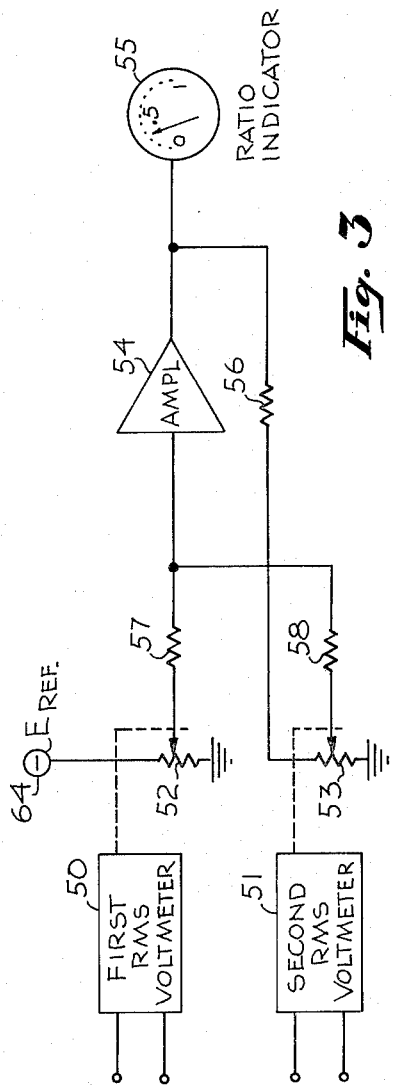
FIG. 3 is a block diagram representation of a system utilizing the invention.

In FIG. 3 an arrangement is shown which employs two R.M.S. voltmeters of the type represented in FIG. 1 in conjunction with other circuitry to provide automatically an indication of the ratio of a pair of alternating signals. As customarily employed in this arrangement, one input signal is derived from an energizing source while another input signal is derived from the output of a particular device being tested. For example, the tested device may be a vibration damping mechanism in which it is desired to develop a plot of amplitude response versus frequency of energizing signals. Alternatively the device being tested may be a filter of which a plot of the frequency response is desired.

In operation, a first voltmeter 50 is connected to the signal derived from the response of the device being tested. This may be considered the numerator of the ratio of proportionality to be presented as the output of the measuring system. A signal derived from the energizing source is applied to the second voltmeter 51 and may be considered the denominator of the output ratio. A potentiometer 52 is connected to a negative source 64 of reference voltage and its movable arm is mechanically linked to the servomotor 14 (FIG. 1) driven by the first voltmeter 50. The arm of the potentiometer 52 is electrically connected through an isolating resistor 57 to the input of an operational amplifier 54, known in the art, which provides a high amplification for D.C. signals.

The output of the amplifier 54 is applied to a ratio indicator device 55 which, in the depicted arrangement, is arranged to present an indication of the ratio between 0 and 1. The output of the amplifier 54 is also applied through a resistor 56 to a potentiometer 53 as part of a feedback path for the ratio measuring circuit. The movable arm of the potentiometer 53 is mechanically linked to the servomotor 14 (FIG. 1) which is driven by the second voltmeter 51. The arm of the potentiometer 53 is connected through an isolating resistor 58 to the input of the amplifier 54.

It will be clear to those skilled in the art that a ratio measuring circuit such as is represented in FIG. 3 which is controlled by the servomotors 14 of the first and second voltmeters 50, 51 serves to provide an output indication which is a function of the ratio of the input of the first R.M.S. voltmeter 50 to the input of the second R.M.S. voltmeter 51. Thus, the combination of the first and second voltmeters 50, 51 with the depicted ratio measuring circuit in accordance with the invention advantageously serves to provide a simple but effective indication of the ratio of the respective applied input voltages.

Although there have been described above specific arrangements of R.M.S. measuring instruments in accordance with the invention for the purpose of illustration, it will be appreciated that the invention is not limited thereto. Accordingly, any and all modifications, variations or equivalent arrangements falling within the scope of the annexed claims should be considered to be a part of the invention.

What is claimed is:

1. An R.M.S. voltage indicating apparatus comprising first and second signals channels, means in each of said channels responsive to the R.M.S. magnitude of an applied waveform to produce an output proportional thereto, means for coupling a signal of unknown waveform to the first channel, a reference source of regulated A.C. voltage, means for coupling a controllably variable portion of the regulated A.C. voltage to the second channel, means for deriving a resultant signal from the R.M.S. magnitude responsive means of said first and second channels, a servomotor mechanically linked to the A.C. voltage coupling means, means controlled by the servomotor for indicating the position of the A.C. voltage coupling means, and means connected between the signal channels and the servomotor for applying the resultant signal to control said servomotor, said last-mentioned means including an amplifier having a variable gain control and means coupling the servomotor to the variable gain control for varying the amplifier gain inversely with the level of the A.C. voltage coupled to the second channel.

2. An R.M.S. voltage indicating apparatus in accordance with claim 1 further comprising means for maintaining the resultant signal derived from the R.M.S. magnitude responsive means substantially independent of the effects of ambient temperature variations.

3. An R.M.S. voltage indicating apparatus in accordance with claim 2 wherein said last mentioned means comprises a common housing for said R.M.S. magnitude responsive means and a circuit connecting the outputs of said devices in polarity opposition to each other.

4. An R.M.S. voltage indicating apparatus in accordance with claim 1 wherein said amplifier comprises a series impedance, a shunt impedance and means mechanically linked to the servomotor for varying the shunt impedance inversely with respect to the magnitude of the signal of unknown waveform coupled to the first channel.

5. Measuring apparatus for indicating the R.M.S. amplitude of an applied input signal comprising first and second thermocouples exhibiting like characteristics, each having a heater winding with attached input terminals and associated output terminals, means for connecting a pair of like polarity output terminals together in a common connection, means for energizing the heater winding of the first thermocouple in accordance with an applied input signal, a source of variable A.C. reference potential coupled to the heater winding of the second thermocouple, a servo motor having an output shaft for controlling the level of voltage applied from the variable reference potential source, a variable gain amplifier coupled between the remaining output terminals from the first and second thermocouples and the servo motor for driving the servo motor in response to a difference in output signals developed by the first and second thermocouples, means mechanically coupling the servo motor shaft to the variable gain amplifier to vary the gain of the amplifier inversely with the voltage level applied from the A.C. reference potential source, and means for indicating the level of voltage applied from the variable A.C. reference potential source.

6. Measuring apparatus in accordance with claim 5 wherein the variable gain amplifier includes a source of variable biasing potential controllable by the servo motor and a pair of diodes coupled to the source of biasing potential in order to present a non-linear impedance to input signals in the variable gain amplifier.

7. Measuring apparatus in accordance with claim 5 further including means selectively coupled to the first thermocouple for calibrating the variable A.C. reference source and the indicating means coupled to the second thermocouple.

8. An R.M.S. voltage measuring device comprising first and second thermocouples having their output circuits connected in polarity opposition, means for energizing the first thermocouple in accordance with an input waveform to be measured, a variable A.C. reference potential, means for energizing the second thermocouple in accordance with the reference potential, a servomotor for controlling the magnitude of the variable A.C. reference potential, means for generating an alternating voltage in accordance with the resultant output of the thermocouples, means for energizing the servomotor with said alternating voltage, means controlled by the servomotor for indicating the R.M.S. magnitude of the input waveform, and an automatic gain control circuit coupled to the servomotor for maintaining constant the gain of the feedback loop comprising the thermocouples, the servomotor, and the servomotor energizing means, said automatic gain control circuit comprising a signal path, a variable impedance connected in shunt with the signal path and means coupled to the servomotor for controlling the variable impedance to compensate for variations in the response of said thermocouples for different magnitudes of the variable A.C. reference potential.

9. Apparatus for indicating the relative R.M.S. amplitudes of individual applied signals comprising first and second voltmeters, each containing a pair of identical thermocouples in a common output circuit, the first thermocouple being energized by the input waveform applied to the voltmeter and the second thermocouple being energized by a controllable A.C. reference voltage, a mechanical driving mechanism, and means connecting the common output of the thermocouple circuit to control the position of said mechanism; the apparatus further including first and second potentiometers respectively controlled by the mechanisms of said first and second voltmeters, a source of reference potential connected to said first potentiometer, an amplifying stage, means connecting the second potentiometer in a feedback path from the output of the amplifying stage, and means connecting the movable arms of said first and second potentiometers to a common input of the amplifying stage.

10. Apparatus in accordance with claim 9 further including an indicating device connected to the output of the amplifying stage for indicating the ratio of the R.M.S. amplitude of the input waveform applied to the first voltmeter with respect to the R.M.S. amplitude of the input waveform applied to the second voltmeter.

References Cited by the Examiner

UNITED STATES PATENTS

| | | | |
|---|---|---|---|
| 1,121,835 | 12/14 | Hiatt | 324—106 |
| 2,059,594 | 11/36 | Massa | 324—132 |
| 2,212,730 | 8/40 | Downing | 324—106 |
| 2,218,502 | 10/40 | Breitenstein | 324—99 |
| 2,398,606 | 4/46 | Wang | 324—106 |
| 2,668,264 | 2/54 | Williams | 324—99 |
| 2,830,453 | 4/58 | Jones | 324—99 |
| 2,844,777 | 7/58 | Ross | 330—130 |
| 2,909,620 | 10/59 | Graef | 324—140 |
| 2,919,067 | 12/59 | Boyd | 324—140 |
| 2,919,409 | 12/59 | Williams | 330—9 |

FOREIGN PATENTS 1,029,415   5/58   Germany.

WALTER L. CARLSON, *Primary Examiner.*

BENNETT G. MILLER, FREDERICK M. STRADER, *Examiners.*